June 23, 1936.   A. W. MALEY ET AL   2,045,039
SUSPENSION OF RAIL VEHICLES
Filed Oct. 25, 1934   2 Sheets-Sheet 1

INVENTORS
Alfred Walter Maley + Edmund Mackenzie Taunton
By *[signature]*
Attorney.

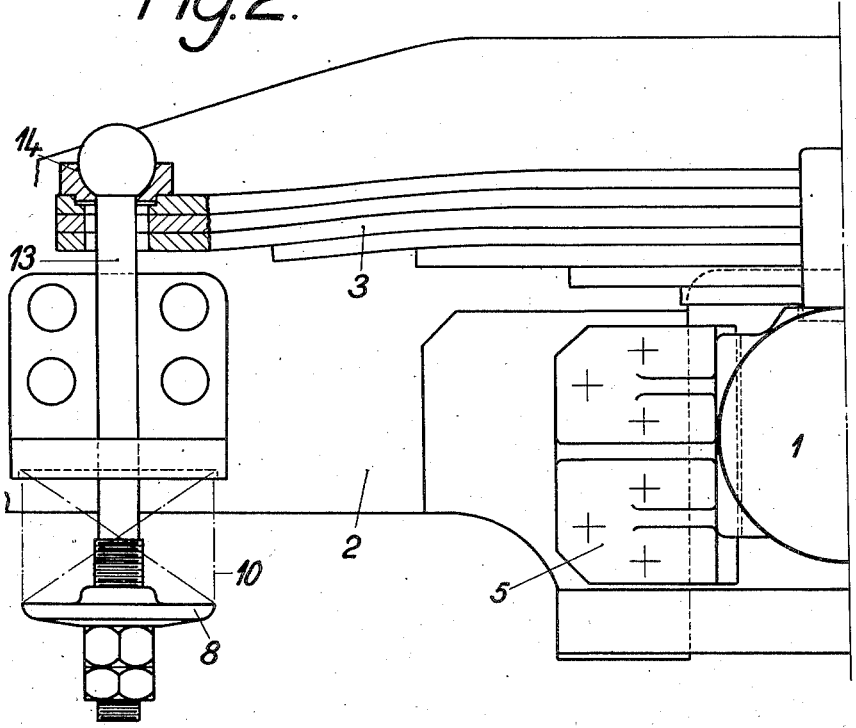
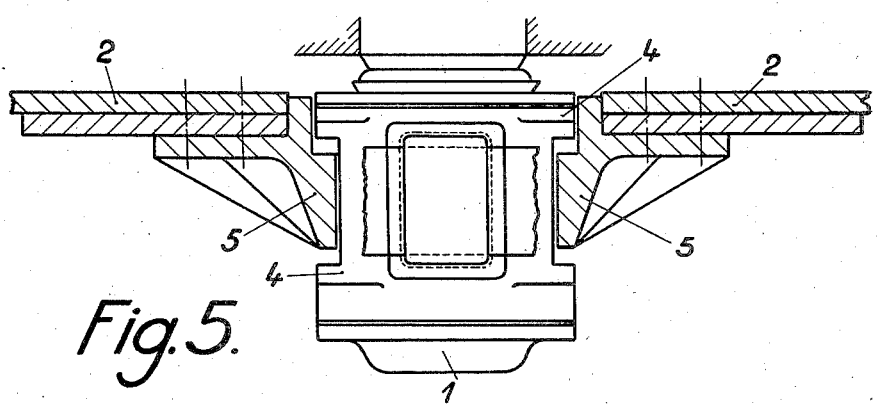

Patented June 23, 1936

2,045,039

UNITED STATES PATENT OFFICE 2,045,039

SUSPENSION OF RAIL VEHICLES

Alfred Walter Maley, Handsworth, Birmingham, and Edmund Mackenzie Taunton, Harborne, Birmingham, England Application October 25, 1934, Serial No. 749,916
In Great Britain October 27, 1933

2 Claims. (Cl. 105—224)

This invention relates to the mounting of rail vehicles upon their wheels.

To reduce the lateral acceleration to which a rail vehicle is subjected in passing irregularities in the track or entering upon curves, and thereby to lessen wear upon the wheel flanges and rails, the end axles of the vehicle and their axle boxes have endwise play relatively to the vehicle truck, and links swinging transversely to the vehicle are interposed between the truck and the springs by which it is carried on the axle boxes.

The invention is to be distinguished from swing link axle boxes, in which links swinging transversely of the vehicle are hung over the axle boxes and support spring planks. It is also to be distinguished from six-wheeled rail vehicles in which the middle axle has endwise freedom in order that its wheels may adapt themselves to curved track, the connection between the springs of the middle axle and the frame being made through transversely swinging links. Nor does it extend to "radial axle" constructions, where the axle is free to swing horizontally relatively to the truck, some designs of which include between the truck and spring links swinging transversely and longitudinally, the intention being that on curves the axles shall set themselves along the radii of the track.

In the case of bogie-vehicles where the bogie has a pivotal connection with the main frame, each bogie is to be considered as a separate vehicle for the purpose of the invention. For example, in a well-known type of bogie truck for railway vehicles the truck is hung by links from the ends of semi-elliptic or other laminated springs which rest upon the axle-box. For the purpose of the invention these links have pivotal connections with the springs which permit them to swing transversely of the vehicle; and the usual flanges on the axle-box are omitted or more widely spaced so that the horns of the truck are no longer a close fit between them.

By way of illustration of the invention constructions embodying it are shown in the accompanying drawings.

Figures 1 and 2 are an elevation of an axle box carrying a laminated spring, and alternative forms of swing link are shown at the ends of the spring.

Figure 5 is a sectional plan showing the axle box within the side member of the bogie frame.

Figure 1:
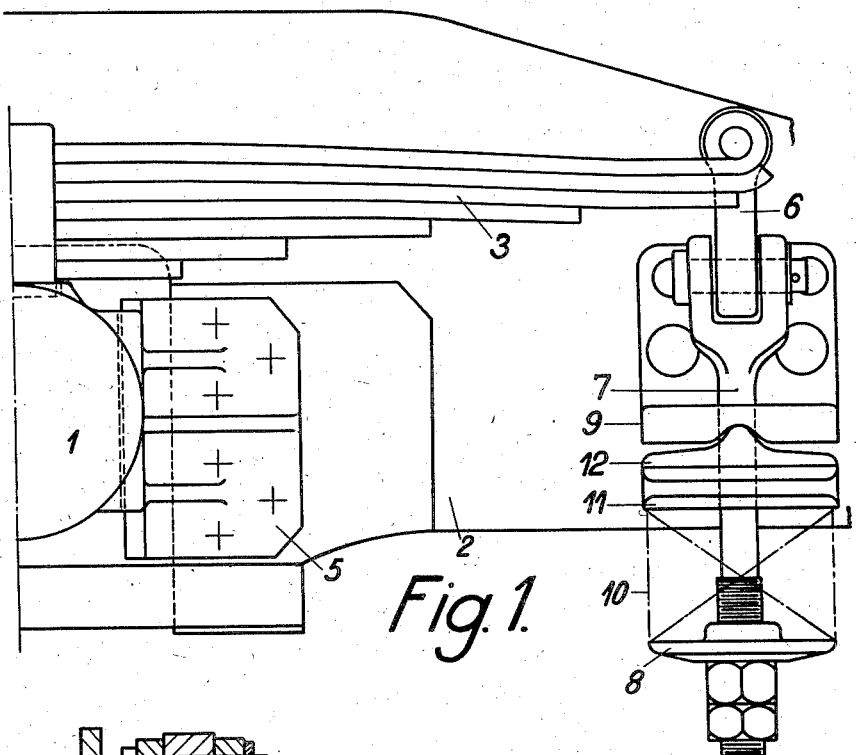

The axle box 1 supports the frame member 2 through a laminated spring 3. The flanges 4 of the axle box are wider spaced apart than the width of the horns 5 of the truck in which the box slides as usual vertically, and so the box and axle can move endwise, that is transversely of the vehicle.

So that this transverse movement can take place without undue hindrance when the brakes are applied the brake shoe hangers or links should be arranged to permit the shoe to follow the transverse movement of the wheels. Also in the case of electric motor coach bogies the mounting of the motors must be so arranged as not to hinder free transverse movement of the axles relatively to the truck.

Figure 3:
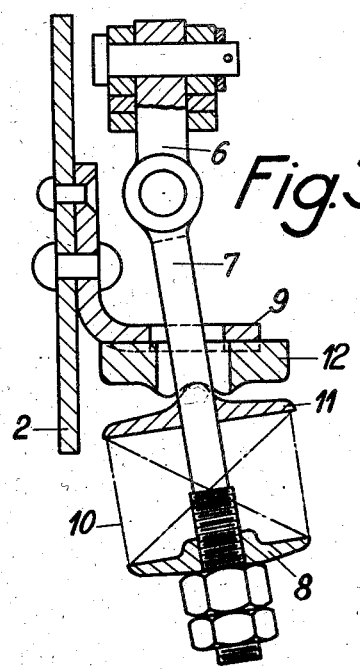
Figure 3 is an elevation at right angles to Figure 1 of the form of link shown on the right of that figure.

Provision is made for this transverse movement in the suspension of the truck by the use of a link which can swing transversely. As a rule the ends of the laminated spring resting on the axle box support the frame through links which can swing longitudinally of the vehicle to allow for the flattening or flexure of the spring. In Figure 1 this known construction is shown modified for the purpose of the invention. There is hung upon the end of the spring 3 a short link 6 swinging relatively to the spring lengthwise of the vehicle, and to this is pivoted a link 7 swinging relatively to it transversely to the vehicle. The link 7 may normally hang vertically, or, where the axle box bearing is adapted to withstand continuous end thrust, it may normally be inclined as shown in Figure 3, or in the opposite direction, such inclination modifying the amount of lift of the vehicle for a given transverse movement relative to the truck. The pivot of link 7 may be about on a level with the seat of the spring on the axle box for an average loading of the spring, so that the slanting pull of the link exerts no great twist upon the spring.

At the lower end of the link 7 is a washer 8, upon which is a rubber block or helical spring 10 surrounding the link and supporting a bracket 9 secured to the truck. If this block or spring does not yield easily enough to the swing of the link a rocking or universal joint may be interposd. In the construction shown in Figures 1, 2 and 3 the spring or rubber block supports a second washer 11 which has a rib on its upper surface. This rib enters a recess in the underside of an intermediate washer 12, which has on its upper surface a rib at right angles to that recess, and this in turn enters a recess in the bracket 9.

The link 7 passes freely with ample play through openings in the bracket 9 and washer 12, and the ribbed washers allow of rocking movement in directions at right angles.

Figure 4:
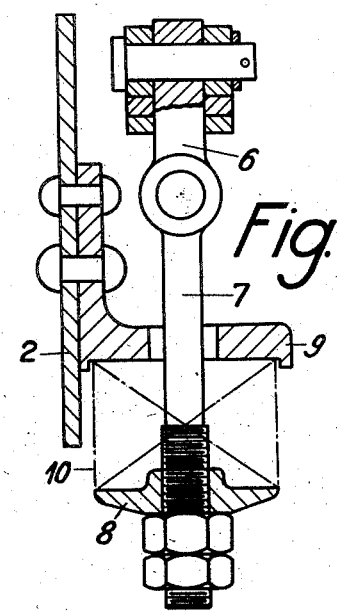
Figure 4 is a similar elevation of a modification.

Figure 4 shows a modification of this construction, the washers 11 and 12 being omitted, and the link 7 being vertical in the normal relative position of axles and truck. The lift produced by a given swing of a link, whether vertical or inclined, may be increased by using next the bracket 9 a T or other equivalent head or a washer kept at right angles to the link by a sleeve extension.

In Figure 2 another modification is shown, though it will be understood that different constructions would not ordinarily be used in one vehicle. Instead of making the suspension link in two parts 6, 7, rocking in directions at right angles, there is a single link 13 having a spherical seating 14 on the end of the spring 3. If swing lengthwise of the vehicle is considered unnecessary there may be a hinge connection between the link 13 and spring 3 similar to that between the links 6 and 7.

Either the transverse or the longitudinal swinging movement may be sufficiently provided for by using a spring link, built, for instance, of a number of laminations, the spring link yielding resiliently in one direction and swinging in the other direction by virtue of a hinge connection with the laminated vehicle spring and the truck.

We claim:

1. In a rail vehicle the combination with an end axle thereof, of axle boxes mounted on said axle, a truck frame having guides engaging said axle boxes and preventing movement thereof relatively to the ruck lengthwise of the vehicle, laminar springs resting on said axle boxes, links supported from the ends of said springs capable of swinging transversely of the vehicle, cushions carried by said links, brackets upon said truck frame above said cushions, and a plate interposed between each cushion and the bracket above it shaped to rock about a line running lengthwise of the vehicle.

2. In a rail vehicle the combination with an end axle thereof, of axle boxes mounted on said axle, a truck frame having guides engaging said axle boxes and preventing movement thereof relatively to the truck lengthwise of the vehicle, laminar springs resting on said axle boxes, cushions, suspension means supporting each cushion from the end of a spring and permitting movement of the cushion lengthwise and transversely of the vehicle, brackets upon said truck frame above said cushions, and a plate interposed between each said cushion and the bracket above it shaped to rock relatively to both cushion and bracket, relatively to the one about an axis running lengthwise of the vehicle and relatively to the other about an axis running transversely of the vehicle.

ALFRED WALTER MALEY.
EDMUND MACKENZIE TAUNTON.